Jan. 31, 1967   F. WOMMELSDORF   3,301,044
SYSTEM FOR TESTING PAPER CUPS FOR LEAKS
Filed Oct. 1, 1963   3 Sheets-Sheet 1

INVENTOR
Fritz Wommelsdorf

BY Dezsoe Steinherz
ATTORNEY

Jan. 31, 1967  F. WOMMELSDORF  3,301,044
SYSTEM FOR TESTING PAPER CUPS FOR LEAKS
Filed Oct. 1, 1963  3 Sheets-Sheet 2

INVENTOR
Fritz Wommelsdorf

BY Dezsoe Steinberg

ATTORNEY

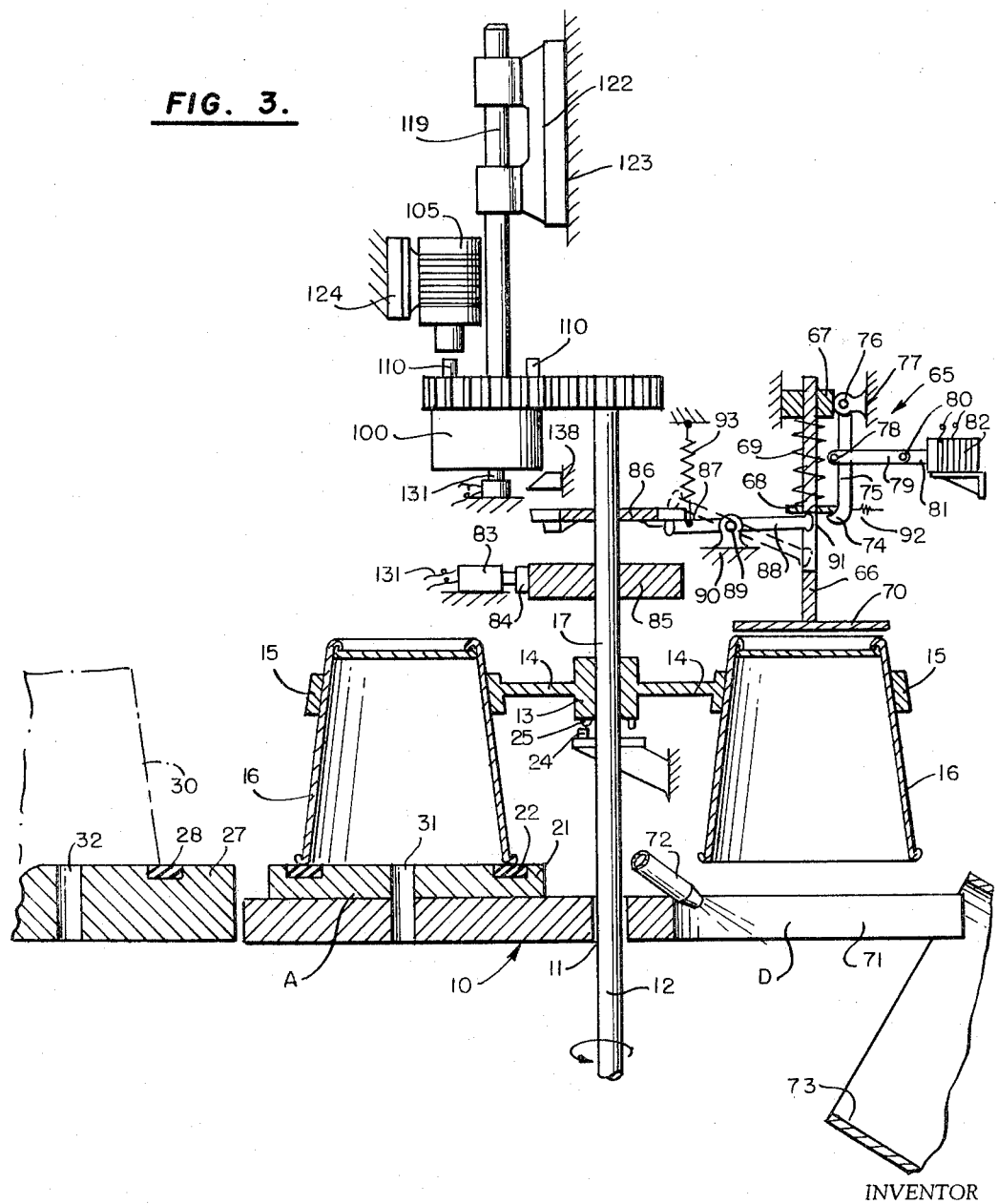

United States Patent Office 3,301,044
Patented Jan. 31, 1967

3,301,044
SYSTEM FOR TESTING PAPER CUPS FOR LEAKS
Fritz Wommelsdorf, Eggersallee 23,
Hamburg-Altona, Germany
Filed Oct. 1, 1963, Ser. No. 313,058
19 Claims. (Cl. 73—45.2)

This invention relates to a testing system, and has particular applicability to the testing of paper cups or the like for manufacturing defects.

This application constitutes a continuation-in-part of my co-pending application entitled Testing System, Serial No. 80,611, filed January 4, 1961, now abandoned.

A primary object of this invention is the provision of a system and apparatus for testing hollow articles, such as paper cups or the like, for defects or leaks which may have been occasioned during the manufacturing process, together with a means for automatically rejecting defective cups and conveying prefect cups to a preselected location for packing, storing or other treatment.

As conducive to a clearer understanding of this invention, it may here be pointed out that in a checking device for paper containers such as two-piece conical paper cups it is desirable to check, after the cup is finished, whether the paper or cardboard carton has been damaged so that the cup is leaky. Apparatus is known, such as that employed in checking cartridge cases, in which compressed air or air of reduced pressure is applied by means of which relatively crude determination of defects may be made, such as merely finding out whether a bottom part has been inserted in a cup. Such an examination can be carried out either mechanically or optically. If, however, it is desired to determine whether smaller cracks or gaps, of the order for example of the magnitude of a pin head, are present in the cup and to sort out defective cups, and if for this purpose air is employed, a difficulty arises in that the paper itself is permeable by air, whereby in the use of compressed air under pressure as well as in the application of suction, irregular pressure conditions will occur due to the varying porosity of the paper. Such variations, superimposed on the differences in pressure derived from defects in cementing the parts of the cup or damage to the paper render accurate measurements difficult, if not impossible with the use of presently existing devices. An important object of this invention is to overcome this difficulty by checking each individual cup against a cup which is known to be free from defects by employing very small suction values. At these values the passage of air through the pores in the power is minute and can be neglected, while in the case of damage to the paper measurable differences will occur. Such differences are of the order of magnitude of barometric fluctuations from, for example, 20 to 50 millibars. However, heretofore relatively expensive means have been necessary for producing reduced pressures of sufficient uniformity, which uniformity is necessary to eliminate the effect on the measurements of tolerances in the production of reduced pressure and of variations in barometric pressure occasioned by weather changes. A further object of the present invention is to eliminate the above-mentioned difficulties. In accordance with the instant invention the reduced pressure is regulated by a throttle valve or an exit valve connected in parallel, which acts simultaneously on the cup to be examined and on a constant measuring or standard cup, any difference between the constant pressure in the standard cup and the pressure in the cup to be checked being visually indicated. In the event that such difference exists, the pressure differential is employed to actuate an electro-mechanical means for sorting out a defective cup.

Other objects will in part be obvious and in part be pointed out as the description of the invention proceeds and shown in the accompanying drawings wherein there is illustrated a preferred form of the instant inventive concept.

In the drawings:

FIG. 3 is a side view partially in elevation and partially in section taken substantially along the line 3—3 of FIG. 2 as viewed in the direction indicated by the arrows showing one of the cup ejecting mechanisms.

Similar reference characters refer to similar parts throughout the several views of the drawings.

Figure 1:
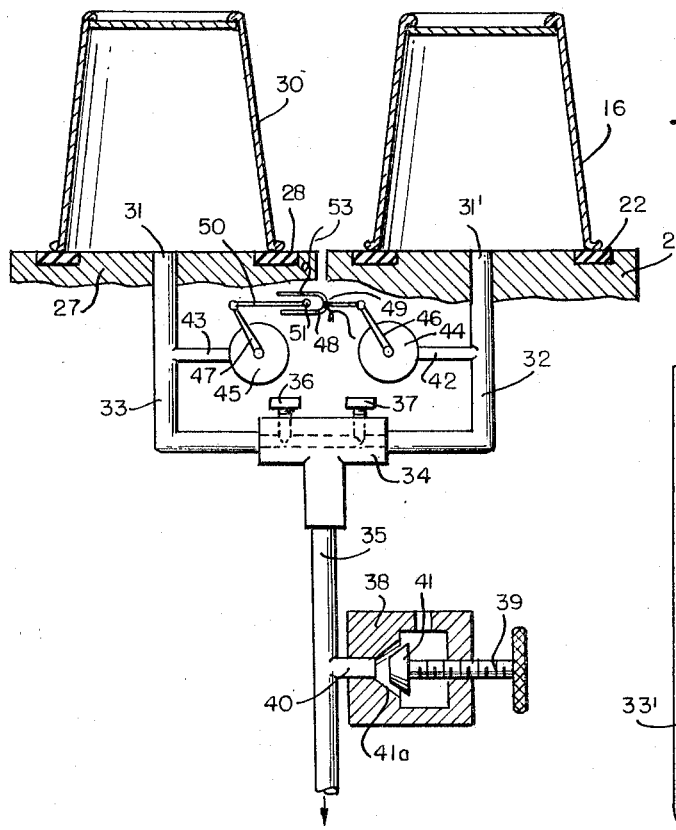
FIGURE 1 is a schematic view partially in elevation and partially in section of one form of testing apparatus employed with the system of the instant invention taken substantially along the line 1—1 of FIG. 3 as viewed in the direction indicated by the arrows.

Having reference now to the drawings in details, and more particularly to FIGS. 3 and 1, there is generally indicated at 10 a support or stand having a central opening 11 therein through which extends a rotatable shaft 12. Any suitable means are provided for rotating the shaft in an intermittent step-by-step manner, such step-by-step rotation being conventional. Shaft 12 is provided at an intermediate point with a collar 13, from which extend a plurality of radial arms 14. At the outer end of each arm 14 is a ring-type gripping device 15 which is adapted to fit over the smaller end of a frusto-conical paper cup 16 or the like and retain the same in the ring by friction. Collar 13 may be keyed to shaft 12 as by means of a key 17 in such manner that the collar rotates with the shaft but limited linear movement thereof is permitted, for a purpose to be described more fully hereinafter.

In the illustrative embodiment of the invention herein shown, the support or table 10 is provided with four stations, the first of which, indicated at A, being an entry or positioning station, at which each individual cup 16 is centered on a ring 20 for gripping by one of the gripping devices 15. From this position as the shaft 12 rotates a quarter turn the cup is conveyed to the next station B, which is a testing station. The testing station includes an annular block 21 on the upper surface of which is positioned a soft rubber sealing ring 22 or the like, upon which the cup 16 to be tested is deposited after a quarter rotation of shaft 12. A cam ring 23 is suitably supported in a position surrounding shaft 12 and contains protuberances 24 on its upper surface which engage corresponding depending lugs 25 on collar 13 so that each cup is raised by its associated gripping ring 15 between station. Thus the cup 16 is deposited firmly on ring 22 to effect a substantially vacuum-tight seal between the cup and the base upon which it is carried.

A test block 26 is positioned immediately adjacent test station B and carries a circular block 27 provided with a sealing ring 28 of soft rubber or the like upon which is positioned in inverted relation a perfect or proven cup 30, against which the cup 16 is to be tested. Each of blocks 21 and 27 is provided with a central opening 31 and 31' respectively into which extend vacuum pipes 32 and 33. The vacuum pipes 32 and 33 are connected to a T 34 to the stem of which is connected a vacuum line 35. Adjusting screws 36 and 37 are provided on opposite sides of the cross head of the T to provide minute adjustments of air pressure in lines 32 and 33. A regulating valve 38 provided with an operating screw 39 is connected by means of a passage 40 to vacuum line 35 for adjusting the vacuum pressure in the line. Screw 39 is provided with a conical head 41 which fits in the conical opening 41a, and the arrangement is such that the vacuum may be regulated by the relative distance between head 41 and its associated opening 41a. The suction can be reduced to zero when the cross section of the opening 41a becomes larger than the cross section of the suction tube 35. Suction is applied to the tube 35 in any desired conventional manner.

Branch lines 42 and 43 extend from tubes 32 and 33 respectively to pressure gauges 44 and 45, each of which carries a pointer 46 and 47. The pointers are interconnected by means of a telescopic arrangement schematically indicated as a female member 48 containing at its inner extremity a contact 49 and a male member 50 having at its outer end a contact 51. The contacts are normally separated and when the pointers 46 and 47 move synchronously, indicating identical pressure in each of the cups 16 and 30, the contacts remain separated. However, when the cup 16 is defective due to leakage or other imperfections and a pressure differential consequently occurs so that the pointer 46, for example, moves to a lesser degree than the pointer 47, contact is established between contacts 49 and 51, to cause a circuit between wires 52 and 53 for a purpose to be more fully described hereinafter.

It will thus be seen that any deviation in pressure registered by the pointers 46 and 47 will close a circuit and, through such circuit, effectuate mechanism hereinafter to be described.

Figure 1A:
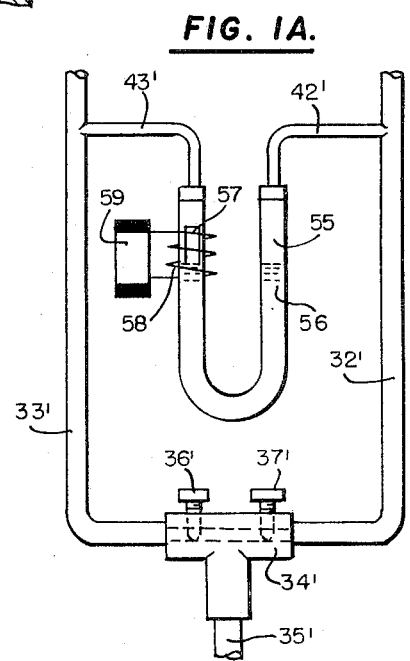
FIG. 1a is a fragmentary view similar to FIG. 1 but showing a modified form of apparatus.
Figure 5:
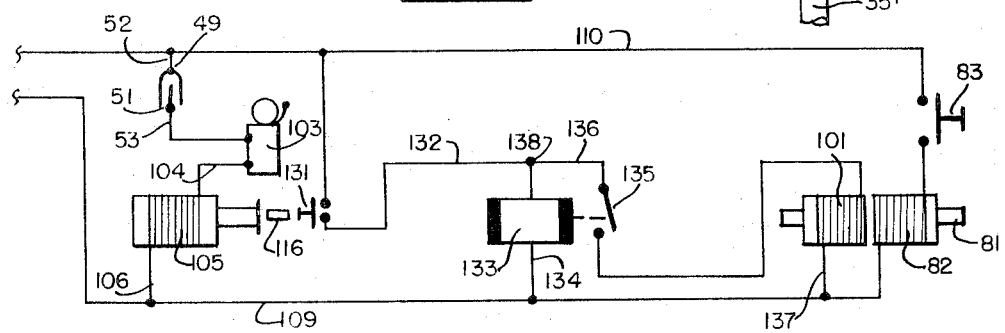
FIG. 5 is a schematic wiring diagram showing the operative relationship of the various components.

A modified form of testing device is indicated in FIG. 1a wherein vacuum lines 32' and 33' are connected to openings 31 and 31' as in the previous modification, and extend to a T fitting 34' the stem of which communicates with the vacuum line 35', and in the cross head of which are positioned regulating screws 36' and 37'. In this modification however, vacuum or suction lines 42' and 43' extending from lines 32' and 33' respectively extend to a U-shaped tube 55 which is partially filled with fluid 56 such as water. A hollow iron float 57 normally floats on the surface of the water in one leg of the tube. The portion of the tube adjacent the float is surrounded by a coil 58 which is connected to a relay 59. Any pressure differential in the lines 42' and 43' will cause the float 57 to move out of the coil 58, thus varying the inductance to the relay 59 and actuating the same in a known manner. Actuation of the relay 59 will cause a circuit which operates identically to that actuated by the closure of contact 49 and 51.

Upon the next rotative step of shaft 12 the cup passes to station C, wherein defective cups are ejected. If the cup is perfect, it then passes to station D, at which time it is ejected to be carried to a receptacle for packing or to a storage place or the like.

The testing device hereinbefore described may be employed in conjunction with conventional manufacturing apparatus, or may be employed with a separate device as shown, wherein the cups are individually fed to station A and thence carried to station B for testing.

Figure 6:
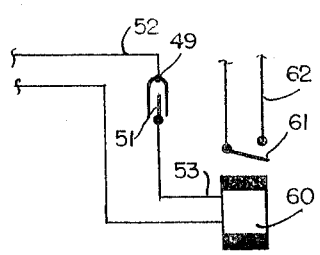
FIG. 6 is a modified schematic wiring diagram.

In the event that the testing device is used as the last step, for example, in the manufacturing process, closure of contacts 49 and 51 will, as best shown in FIG. 6, close a relay 60. The relay 60 will in turn open a switch 61 which is positioned in the main power line 62 to the manufacturing apparatus to immediately shut down the same.

Figure 2:
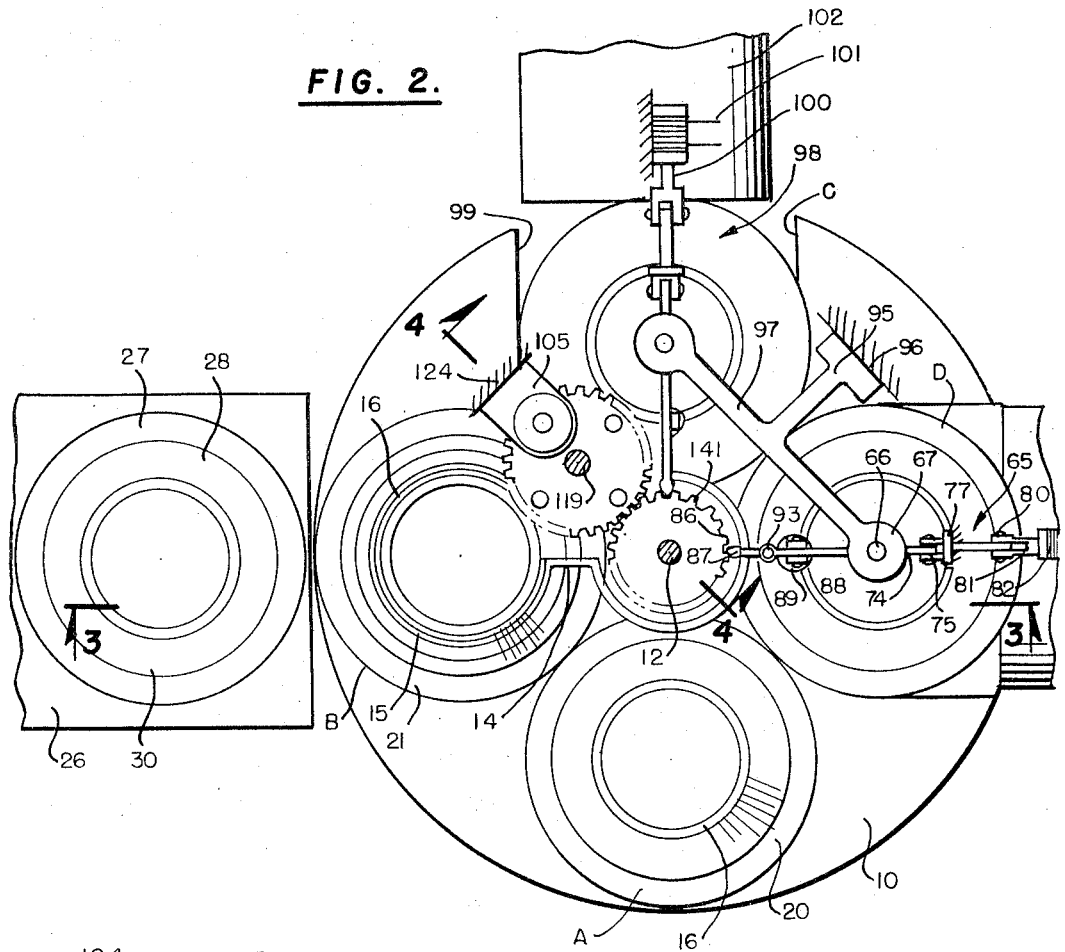
FIG. 2 is a top plan view disclosing portions of the testing apparatus of FIG. 1 together with electromechanical means for ejecting defective cups and storing or stacking perfect cups.

In the event that the device is employed separately, as shown in FIGS. 2 and 3, a pressure differential between a cup 16 to be tested and the standard cup 30 will operate an ejection mechanism at station C. An identical ejector mechanism is positioned at station D which automatically serves to eject perfect cups on each cycle of the apparatus.

One of the ejector mechanisms, that for station D, is generally indicated at 65, and comprises a plunger 66 which is slidably mounted in any suitable fixed support 67, and which carries a lug 68 at an intermediate point thereof. A compression spring 69 positioned between the support and the lug serves normally to bias the plunger downwardly. At the lower end of plunger 66 is a plate 70, which, when the plunger is forced downwardly by the spring 69, sharply strikes the top of the adjacent cup 16 and drops the same through an orifice or opening 71 in base 10 into the path of a continuously flowing jet of air from a pipe 72, which blows the cup into an exit pipe 73, from which it is carried to any suitable location for packing or storage.

A hook 74 on the end of a lever 75 which is pivotally mounted as at 76 to a fixed support 77 normally engages under lug or detent 68 until released, at which time the spring 69 acts. The lever 75 is pivotally connected as by a pivot 78 to a link 79, the opposite end of which is pivoted at 80 to the operating core 81 of a solenoid coil 82. The solenoid 82 is energized by a switch 83 which is mechanically closed at each quarter turn of shaft 12 by a protuberance 84 carried on a disc 85 which is fixed to the shaft. Thus the ejector mechanism 65 is actuated at each quarter turn of the apparatus, and a cup positioned over the opening 71 is discharged or ejected. If the gripping ring 15 is empty, due to the previous ejection of a defective cup, the cycle continues uninterrupted.

Resetting of the device is effected by a cam disc 86 which is rotatably fixed to shaft 12 and which contains four cam surfaces which act successively on the enlarged end 87 of a resetting lever 88. Lever 88 is pivoted as by a pivot 89 to a fixed surface 90 and has its other end 91 extending into the path of travel of lug 68. The cam surfaces are so arranged that between the high dwells thereof the lever may be pivoted to the position shown in dotted lines in FIG. 3 to permit the plunger 66 to act, the high dwells being positioned behind the low dwells permitting such action so that the end 87 of the lever is biased downwardly successively to force projection 68 and hence plunger 66 upwardly against the pressure of spring 69 until, when the solenoid 82 is deenergized, a compression spring 92 forces hook 74 into engaging position with the detent 68 to retain the same in inoperative position until next released by energization of the solenoid 82. A compression spring 93 serves to bias the end 87 of lever 88 into engagement with the cam 86.

Fixed support 67 may, if desired, comprise one arm of a bracket 95 suitably secured to a wall 96, and which includes an opposite arm 97 which carries an identical ejecting mechanism 98 which is positioned over an opening 99 in base 10 at station C. The ejecting mechanism 98 includes a solenoid core 100 which is actuated by a solenoid 101 in a manner identical to the solenoid core 81, and which operates a similar ejecting mechanism for the purpose of removing defective cups, dropping them through opening 99 from whence they are carried into a tube 102 by an air blast similar to that emanating from the pipe 72 or otherwise disposed of as defective. Solenoid 101 is however actuated only upon closure of contacts 49 and 51, or alternatively, energization of relay 59. The closure of such contacts indicating, as previously explained, a defective cup, causes first the actuation of an alarm or signal 103, the signal being connected between wire 53 and a wire 104 which extends to a solenoid coil 105. A wire 106 extends from the other side of coil 105 to a line 109, which, with a line 110, comprises the primary electrical circuit to the device, wire 52 being connected to line 110.

Figure 4:
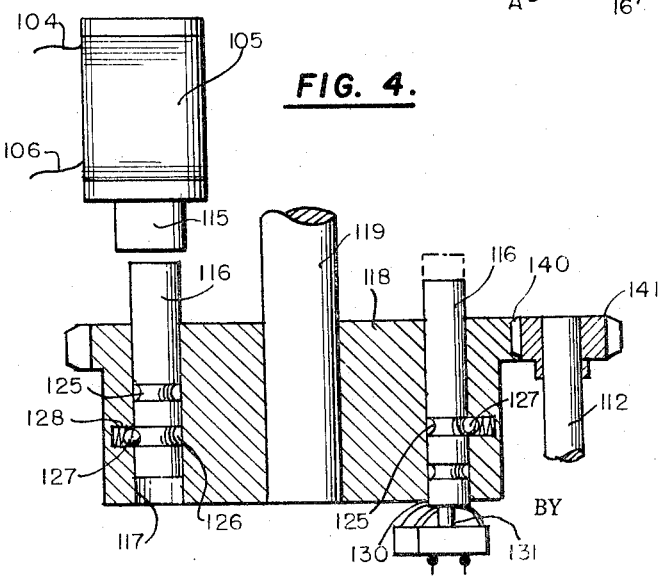
FIG. 4 is an enlarged fragmentary sectional view taken substantially along the line 4—4 of FIG. 2 as viewed in the direction indicated by the arrows.

Energization of solenoid coil 105 causes movement of a core 115 which strikes a pin 116 which is slidably mounted in a bore 117 in a rotatable disc 118, the disc being mounted on a shaft 119, which is rotatably mounted in a suitable bracket 122 carried by a support 123. The solenoid is mounted on any suitable mounting surface 124 as diagrammatically indicated in FIG 3. Pin 116 is one of four pins radially arranged on disc 118, each of which is provided with a pair of grooves 125 and 126, a selected one of which is adapted to be engaged by a spring-pressed ball detent 127 seated in a suitable recess 128 adjacent the pin. When the pin is in its uppermost position as indicated to the left in FIG. 4 no circuit closure is effectuated, since the solenoid 105 has not been energized by closure of contacts 49 and 51. However, actuation of the solenoid core 115 moves the pin to the position shown in the righthand side of FIG. 4 wherein the upper groove 125 is engaged by the adjacent ball detent 127. The lower end 130 of the pin then depends below the disc 118, and engages a fixed contact member 131 positioned in the path of rotation of the pins. Closure of switch 131 closes a circuit through a line 132 which leads to a time delay relay 133, from line 110. The other side of relay 133 is connected through a wire 134 to line 109, so that after a suitable predetermined interval, approximately two tenths of a second, the relay coil 133 serves to close a switch 135. Switch 135 closes through a wire 136, a circuit to relay coil 101, the other side of which is connected through a line 137 to line 109, line 136 being connected through a terminal 138 to line 132, so that relay 101 is energized to actuate ejection mechanism 98 for removal of the defective cup. Pins 116 are returned mechanically to the position shown on the lefthand side of FIG. 4 by means of a ramp or cam surface 138 positioned in the rotative path of the pins after their contact with switch 131. Disc 118 is rotated synchronously with shaft 12 by means of a series of gear teeth 140 surrounding the periphery thereof which engage the corresponding teeth of a pinion 141 fixed to the shaft. In the illustrative embodiment of the invention shown, wherein there are only four stations, the disc 118 is the same size as the pinion 141 so that one complete revolution of the shaft 12 will effectuate one complete revolution of the disc so that the switch 131 may be closed at any one of the four selected positions.

Figure 7:
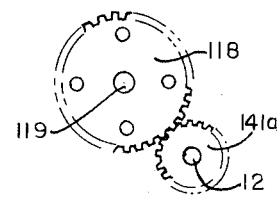
FIG. 7 is a fragmentary detail of a modified form of construction.

Under certain conditions however it is to be understood that intervening stations may be required between the testing station B and the station C for discharge of defective cups. In this instance the disc 118 may be made twice as large as the pinion 141 as shown, for example, in FIG. 7, so that a pin will be depressed only on every second step of the step-by-step rotation of shaft 12. Obviously any desired number of intervening stations may be employed by a suitable selection of the gear ratio between the gear teeth 140 and the pinion 141.

Obviously any suitable hollow space may be substituted for the perfect testing cup 30, but it is preferable that an undamaged perfect cup be employed so that the porosity or permeability of the paper or cardboard to air will be equal in both the cup to be tested and the cup against which it is measured. The accuracy and sensitivity of the device may be increased by closing the suction tube 35 after the pressure has been reduced in the cups 16 and 30, which closure may be effected manually or by means of any suitable connection with the operating mechanism, so that the reduction in pressure will be decreased after a limited time due to the porosity of the paper or defects in the cup as air enters the partial vacuum created by the suction. The elapsed time, approximately two tenths of a second, permits more effective measurement, and, by virtue of the time delay relay 133 time is allowed to permit the cup to be carried to the next station before the switch 135 is closed to actuate relay 101 to eject the damaged cup.

It is to be understood that very small suction values may be employed with the instant invention, in the nature of approximately seven tenths lbs. per square inch below atmospheric pressure.

From the foregoing it will now be seen that there is herein provided an improved testing system for paper cups or the like, together with an automatically actuated ejection system which is selective to remove damaged cups at one station and perfect cups at a second station, which accomplishes all of the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative and not in a limiting sense.

I claim:

1. A system for testing paper cups or similar paper containers and sorting out paper cups having no structural defects comprising the steps of positioning a standard structurally nondefective paper cup at a measuring station, positioning a similar paper cup to be tested at a remote testing station, subjecting both of said cups to a simultaneous and equal action of air under very low reduced pressure, measuring the difference between the reduced pressure in the cup being tested and in the cup at the measuring station, controlling a switching device in accordance with measured pressure differential and actuating a sorting device for sorting out the defective cups from the nondefective cups by said switching device.

2. A system as defined in claim 1, including the step of cutting off the air under reduced pressure, and delaying the action of the switching device.

3. The system of claim 1, including the step of signalling the rejection of a defective cup through said switching device.

4. The system of claim 1, wherein the step of subjecting the container and the measuring space to air under reduced pressure consists of subjecting both of said cups to a pressure of approximately 0.7 p.s.i. below atmospheric pressure.

5. Apparatus for testing paper containers and sorting defective containers from containers having no defects, comprising a support, a cup loading station, a testing station including a base having an opening therein, and first and second cup ejection stations, a standard measuring station including a base having an opening therein adjacent said testing station, a first reduced pressure tube connecting with the opening in the base of said testing station, a second reduced pressure tube communicating with the opening in the base of said measuring station, a common suction pipe communicating with said first and said second reduced pressure tube, a standard nondefective cup positioned on said base of said measuring station, means moving a cup to be tested from said cup loading station and depositing the cup to be tested on said base of said testing station, a branch line extending from each of said reduced pressure tubes, pressure differential measuring means connected between said branch lines, switch means actuated by said pressure differential means, means for moving a tested cup from said testing station to said first ejecting station, first ejection means operable by said switch means for ejecting a defective cup when a pressure differential is detected, means for moving said tested cup from said first ejecting station to said second ejecting station, and means for ejecting said tested cup at said second ejecting station.

6. The structure of claim 5, including alarm means operable by said switch means simultaneously with the actuation of said first ejecting means.

7. The structure of claim 5, wherein said switch means closes a circuit to actuate said first ejecting means, and a time delay relay in said circuit.

8. The structure of claim 5, wherein said pressure differential measuring means comprises a pair of pressure gauges, one connected to each branch line, and each having a needle operable by the pressure in its associated branch line, and a switch contact carried by each needle, engagement of said contacts closing a circuit to said switch means.

9. The structure of claim 5, wherein said pressure differential means comprises a U-shaped fluid-filled tube, a hollow iron float in one leg of said tube, a coil normally surrounding said float, and a relay connected to said coil, whereby a difference in fluid level in said one leg of said U-shaped tube moves said float relative to said coil to change the inductance of said relay to close a circuit to said switch means.

10. The structure of claim 5, wherein a pressure regulating screw is positioned in each of said first and said second reduced pressure tubes.

11. The structure of claim 5, wherein a pressure regulating valve is positioned in said suction pipe.

12. The structure of claim 5, wherein an intermittently rotating shaft is provided in the center of said support, radial arms extend from said shaft, cup-gripping means are provided on the end of each arm, and the intermittent rotation of said shaft occasions the movement of said cup to be tested from said cup loading station to said testing station and to said first ejecting station and said second ejecting station.

13. The structure of claim 12, wherein each of said ejecting means comprises an ejector plate, a vertically movable shaft supporting said plate above an orifice in said support, spring means biasing said shaft toward the top of a cup in said cup gripping means, means normally retaining said shaft in spring compressed relation, trigger means for releasing said means retaining said shaft, solenoid means for actuating said trigger, and means operable by said switch means to close a circuit to said solenoid to release said trigger.

14. The structure of claim 13, wherein an air blast tube is positioned adjacent each orifice in said support for directing an ejected cup to a desired location.

15. The structure of claim 13, wherein cam actuated reset means are provided for repositioning said ejector plate, shaft, spring means and trigger means.

16. The structure of claim 13, wherein said first ejecting means is operable only upon indication of a pressure differential, and said second ejecting means is operable upon intermittent rotation of said intermittently rotating shaft.

17. The structure of claim 13, wherein cam means are provided adjacent said intermittently rotating shaft for raising said radial arms and hence said cup gripping means and said cup to be tested during each intermittent rotative movement of said shaft.

18. The structure of claim 13, wherein said intermittently rotating shaft carries a pinion, a rotatable switch contact disc is positioned adjacent said pinion and rotated thereby, linearly movable pin means are carried by said disc, second solenoid means is positioned in the path of rotation of said pins, a pressure differential indicated by said pressure differential measuring means closes a circuit to said second solenoid means to move the adjacent pin, said switch actuating said first ejecting means being operable by a moved pin.

19. The structure of claim 18, wherein cam means are provided adjacent said rotatable disc in the path of movement of said pins for resetting said moved pins.

References Cited by the Examiner
UNITED STATES PATENTS

| | | | |
|---|---|---|---|
| 1,694,132 | 12/1928 | McDonald | 73—45.1 |
| 3,028,750 | 4/1962 | Rondeau | 73—40 X |
| 3,039,294 | 6/1962 | Inman | 73—45.1 |

LOUIS R. PRINCE, *Primary Examiner.*

S. CLEMENT SWISHER, *Assistant Examiner.*